J. F. SPRINGER.
ROLLER BEARING.
APPLICATION FILED MAR. 28, 1907.

907,908.  Patented Dec. 29, 1908.

Witnesses:
JKE Diffenduffer
Howard J. Myers

Inventor:
John F. Springer

UNITED STATES PATENT OFFICE.

JOHN F. SPRINGER, OF GIRARD, PENNSYLVANIA.

ROLLER-BEARING.

No. 907,908.

Specification of Letters Patent.

Patented Dec. 29, 1908.

Application filed March 28, 1907. Serial No. 365,041.

*To all whom it may concern:*

Be it known that I, JOHN F. SPRINGER, a citizen of the United States, and a resident of Girard, in the county of Erie, State of Pennsylvania, have invented new and useful Improvements in Roller-Bearings, of which the following is a specification.

My invention relates particularly to roller bearings in which the rollers are tapered. While rollers having trunnions at each end as well as rollers pierced longitudinally are by no means excluded from use in this bearing, the present device has the advantage of being especially adapted to solid rollers without trunnions, thus permitting from the point of view of the rollers a very strong and serviceable construction. The construction is also of great value because of great reduction of sliding friction usually encountered in tapered roller bearings at the points where the individual end-thrusts of the rollers are taken.

Figure 1:
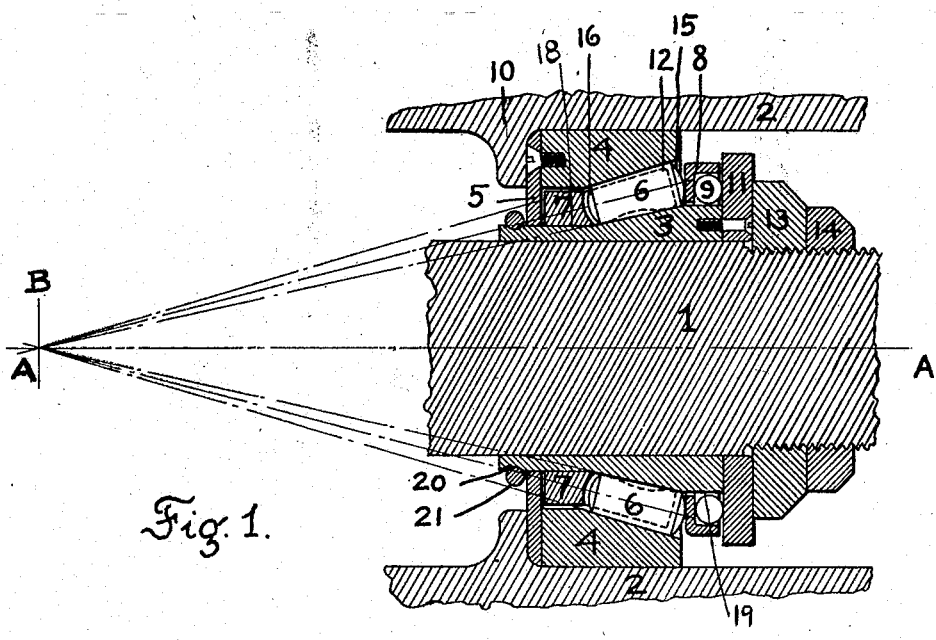
Figure 2:
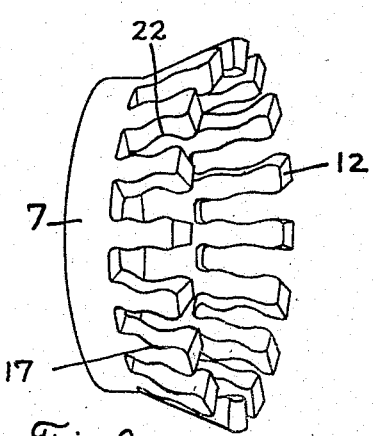
Figure 3:
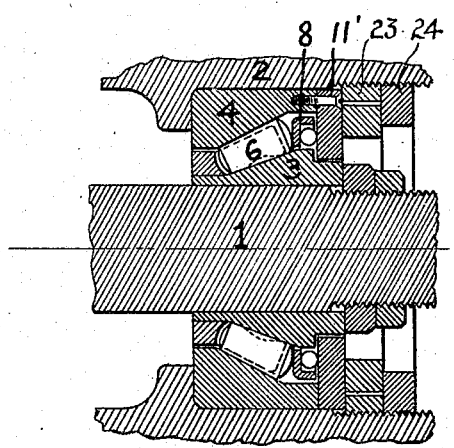

In the accompanying drawing, Figure 1 is an axial section of an embodiment of my invention. Fig. 2 is a perspective view of the cage used in the construction shown in Fig. 1. Fig. 3 is an axial section of a construction alternative to that shown in Fig. 1.

The word "carrier" is used as a broad term referring equally well to either shaft or housing. The word "raceway" refers to the double track formed by the combination of an inner and an outer bearing surface.

In Fig. 1, 1 is a shaft, 2 is a housing. Mounted on the shaft is the bearing ring 3, having a conical bearing surface. At the ends of this ring are the plain cylindrical surfaces 18 and 19. At the smaller end of 3, and interrupting one of the said cylindrical surfaces, is the annular groove 20. In this groove is the split ring 21. This ring is split to permit its being snapped in position. Arranged in the housing is the bearing ring 4 having a conical bearing surface. The conical surfaces of 3 and 4 taper in the same general direction. Preferably, the apices of these conical surfaces are one and the same point B, which is, of course, preferably on the axis A A of the shaft 1. The ring 4 abuts against the surface 10 which is integral with the housing 2. The flange portion 5 at the thicker end of 4 is to all intents and purposes a part of 4. It may be made integral with 4, and is only made separate for convenience in construction. It is to be considered a part of 4.

Between the bearing rings 3 and 4, and conforming to their conical surfaces are the tapered rollers 6. The main body of these rollers is the frustum of a cone of revolution. These rollers are rounded at the larger end giving the rounded surface 15. They may be rounded at the smaller end, as shown at 16. They are maintained in position and separation by a cage having an annular band 7 from which band the fingers 12 project at an angle. The inner surfaces of this cage conform closely to the surface 18 and the conical surface of the ring 3. However, the angular ridge formed by the junction of the inner surfaces of the cage may be slightly rounded so as not to fit too closely the corresponding angular depression in the ring 3. In the particular construction shown in Fig. 1, the inner cylindrical surface of 7 fits the surface 18 with a close sliding fit. Likewise, the portions of the fingers 12 next to 3 conform—not individually, but as a whole—to the conical bearing surface of 3 with a close sliding fit. These portions of 12 may be concave and conform individually to the conical surface of 3. Preferably, however, they should be made convex, contacting, each, with 3 in but a single line. Even this contact may be reduced by cutting away—a very slight removal of material is sufficient—portions of the contacting lines of 12. Contact should, however, be retained at the ends of the fingers away from 7. Likewise, the contacting surface of 7 may be reduced by making annular grooves in it. The cage may, aside from 5, be completely out of contact with 4. Of course, the cage may be constructed so as to have the outside cylindrical surface of 7 and the fingers 12 conform to 4 instead of 3. The fingers of the cage, however it is constructed, alternate with the rollers 6, and afford means not only of separating the rollers but of maintaining their position. The sides of these fingers, upon which sides dependence is put to maintain position, may be of a variety of forms. They should not confine the rollers too closely, but allow some play. They may be concave, conforming thus more or less to the rollers; or, they may be convex, or plane. In any case, when the roller comes in actual contact, this contact should not be a surface contact but lineal. The direction of this line of contact should preferably pass through B. Further, these side surfaces of the fingers may be so shaped that the roller when in contact therewith will not contact along the whole of its length. Two points are sufficient, as two points are sufficient to direct the roller towards B. A method of shaping these side surfaces of the fingers so as to reduce the line of contact with roller is shown in Fig. 2.

In Fig. 1, the dotted line shows the general position of the fingers 12.

The pressure on the bearing (whether that pressure is radial or thrust, or both) produces an individual thrust of the tapered roller in the direction of its larger end. This thrust is received by the ring 8, which may be made cup shaped, as shown in Fig. 1. Within this cup is the row of balls 9. The thrust of the rollers 6 communicated to the ring 8 is transmitted to the balls 9. In turn it is taken by the ring 11, which may be made integral with the bearing ring 3. The thrust, thus communicated to the combination of the rings 3—11, is taken by the nuts 13 and 14. The combination of the rings 3—11 also receives a thrust from the rollers 6 not communicated through the ring 8 and the spherical rollers 9. The nuts 13 and 14 bear this, also. When the bearing is in operation, the rollers 6 communicate a rotational motion to the ring 8, which it is the office of the balls 9 to prevent becoming a slide between the rings 8 and 11. It will be observed that the ring 8, together with the balls 9, is mounted on the cylindrical surface 19. Preferably the dimensions of the parts concerned should be so adjusted that the point of contact of any roller 6 with the ring 8, the point of contact of the ring 8 with one of the balls 9, and the center of the same ball 9 are three points in a right line. The thrust bearing consisting of the rings 8—11 and the spherical rollers 9 may be replaced by a roller thrust bearing in which the rollers have line-contact.

In Fig. 2 is shown a view of the roller cage used in the construction shown in Fig. 1. Observe the depressions 17 and 22.

In Fig. 3 is shown a construction alternative with that shown in Fig. 1. The individual thrust of the rollers 6 is here received by the ring 11'. As the ring 11' is shown secured to the bearing ring 4 by screws, this thrust would be borne by the ring 11', the screws and the bearing ring 4. The rings 23 and 24 having screw-threaded engagement with the housing 2 may be used to take up this strain. They may be omitted, however, if thought desirable. An advantage of this construction is that it relieves the nuts on the shaft from the individual thrust of the rollers.

The ring 21 (Fig. 1) is to render the bearing self-contained when handling. This is likewise the office of the interlocking construction shown in Fig. 3 as between the bearing ring 3 and the ring 11'.

Various modifications of the construction shown in Fig. 1 may be used. Thus rollers held in a cage formed of two bands riveted together—whether rollers are perforated lengthwise to permit them to be mounted on rivets, or have journals of their own operating in said bands—may be used. The form and position of a part, at least, of the holding means consisting of the rings 8—11 together with the balls 9 should be modified so as to clear the band at the larger end of the rollers.

The flange portion 5 may ordinarily be omitted, as well as the ring 21, if it is not desired to make the bearing self-contained. However, if the conical surfaces of the rings 3 and 4 taper but very gently, it may seem desirable to retain the flange portion 5 for the purpose of assisting in retention of the cage 7—12 in position. In the extreme case where the conical surfaces become cylindrical, some such means as the flange portion 5 would be necessary to retain the cage.

The object of the general conformation of part of cage 7—12 to the bearing ring 3 or to the bearing ring 4 is to maintain it in position to enable fingers 12 to maintain position of rollers 6.

The particular construction shown in Fig. 1 is typical more especially of a combination journal-and-thrust bearing. By increasing the abruptness of the tapers of the bearing rings, we should derive a bearing in which the function of thrust endurance becomes more and more prominent.

The ring 8, the rollers 9 and the ring 11 together form what may suitably be described as an antifriction retaining device. This antifriction retaining device consists of two bearing plates—the rings 8 and 11—and of the antifriction rollers 9 (which in the present case are spherical in form).

Having described my invention, what I claim as new is:

1. A roller bearing comprising two carriers; a bearing ring having a conical bearing surface and carried by one of the said carriers; a second bearing ring having a conical bearing surface and carried by the other of the said carriers, the two said bearing rings being suitably formed and arranged to form a roller raceway for tapered rollers; tapered rollers, rounded at the larger end, in the said raceway and contacting with the said bearing rings forming the said raceway; a roller cage suitably formed to maintain position of said rollers; an antifriction retaining device, one bearing plate of which is free and in contact with the rounded ends of the said tapered rollers, the other bearing plate being suitably arranged to operate as a unit with one of the said bearing rings forming the said roller raceway; and, means suited to resist the longitudinal thrust of the said bearing rings forming the said roller raceway.

2. A roller bearing comprising two carriers; a bearing ring having a conical bearing surface and carried by one of the said carriers; a second bearing ring having a conical bearing surface and carried by the other of the said carriers, the two said bearing rings being suitably formed and arranged to form a roller raceway for tapered rollers; tapered rollers, rounded at the larger end, in the said raceway and contacting with the said bearing rings forming the said raceway; a roller cage having an annular band with fingers projecting therefrom, said cage in part conforming to part of one of said bearing rings, said fingers being disconnected from each other at one end and being adapted to maintain said rollers in position; an antifriction retaining device, one bearing plate of which is free and in contact with the rounded ends of the said tapered rollers, the other bearing plate being suitably arranged to operate as a unit with one of the said bearing rings forming the said roller raceway; and, means suited to resist the longitudinal thrust of the said bearing rings forming the said roller raceway.

3. A roller bearing comprising two carriers; a bearing ring having a conical bearing surface and carried by one of the said carriers; a second bearing ring having a conical bearing surface and carried by the other of the said carriers, the two said bearing rings being suitably formed and arranged to form a roller raceway for tapered rollers; tapered rollers rounded at the larger end, in the said raceway and contacting with the said bearing rings forming the said raceway; a roller cage having an annular band with fingers projecting therefrom, said cage in part conforming to part of one of said bearing rings, said fingers alternating with said tapered rollers, being disconnected from each other at one end and being adapted to maintain said rollers in position; an antifriction retaining device, one bearing plate of which is free and in contact with the rounded ends of the said tapered rollers, the other bearing plate being suitably arranged to operate as a unit with one of the said bearing rings forming the said roller raceway; and, means suited to resist the longitudinal thrust of the said bearing rings forming the said roller raceway.

4. A roller bearing comprising two carriers; a bearing ring having a conical bearing surface and carried by one of the said carriers; a second bearing ring having a conical bearing surface and carried by the other of the said carriers, the two said bearing rings being suitably formed and arranged to form a roller raceway for tapered rollers; tapered rollers in the said raceway and contacting with the said bearing rings forming the said raceway; means adapted to maintain position of said rollers; an antifriction retaining device, one bearing plate of which is free and in contact with the larger ends of the said tapered rollers, the other bearing plate being suitably arranged to operate as a unit with one of the said bearing rings forming the said roller raceway; and, means suited to resist the longitudinal thrust of the said bearing rings forming the said roller raceway.

5. A roller bearing comprising the two carriers, 1 and 2; a bearing ring, 3, carried by one of the said carriers, 1, and having a conical bearing surface; a second bearing ring, 4, having a conical bearing surface and carried by the other of the said carriers, 2, the two said bearing rings being suitably formed and arranged to form a roller raceway for tapered rollers; tapered rollers, 6, rounded at the larger end, in the said raceway and contacting with the said bearing rings forming the said raceway; a roller cage, 7—12, suitably formed to maintain position of said rollers, said cage consisting of an annular band, 7, with fingers, 12, projecting therefrom, said cage in part conforming to part of said bearing ring, 3, said fingers, 12, being disconnected from each other at one end and being adapted to maintain position of said rollers, 6; an antifriction retaining device, consisting of the bearing plates 8—11 and the spherical rollers 9, one bearing plate, 8, of which is free and in contact with the rounded ends of the said tapered rollers, the other bearing plate, 11, being suitably arranged to operate as a unit with the bearing ring 3; and, means, consisting of the flange 10 and the nuts 13—14, suited to resist the longitudinal thrusts of the bearing rings 4 and 3.

In testimony whereof I have hereunto subscribed my name in the presence of two attesting witnesses, at Girard, county of Erie, State of Pennsylvania, on the twenty-third day of March, nineteen hunderd and seven.

JOHN F. SPRINGER.

Witnesses:
WILLIAM L. SHERMAN,
JAMES C. MURPHY.